United States Patent [19]

Saubolle

[11] Patent Number: 5,122,781
[45] Date of Patent: Jun. 16, 1992

[54] HAZARD WARNING LIGHT

[75] Inventor: Malcolm C. Saubolle, Brampton, Canada

[73] Assignee: Bolan Trading Inc., Toronto, Canada

[21] Appl. No.: 578,299

[22] Filed: Sep. 6, 1990

[51] Int. Cl.$^5$ .............................................. B60Q 7/00
[52] U.S. Cl. .................................. 340/473; 340/908; 116/63 P
[58] Field of Search .............. 340/900, 908.1, 471, 340/468, 473, 762, 782, 815.03; 116/63 P; 40/610, 612; 362/800, 802, 394, 83.3

[56] References Cited

U.S. PATENT DOCUMENTS

| | | | |
|---|---|---|---|
| 2,144,858 | 1/1939 | Smith | 362/802 |
| 2,237,536 | 4/1941 | Wells . | |
| 2,586,149 | 2/1952 | Coble | 248/169 |
| 2,972,739 | 2/1961 | Opper . | |
| 2,975,412 | 3/1961 | Fuller | 116/63 P |
| 3,415,476 | 12/1968 | McDermott . | |
| 4,447,802 | 5/1984 | Bose | 340/473 |
| 4,547,837 | 10/1985 | Bennett | 362/800 |

FOREIGN PATENT DOCUMENTS

| | | | |
|---|---|---|---|
| 59-981 | 1/1984 | Japan | 362/800 |
| 8503795 | 8/1985 | PCT Int'l Appl. | 340/782 |

OTHER PUBLICATIONS

Wagner, "2-Color LED+Driver", v. 25, No. 19, Oct. 20, 1980.

*Primary Examiner*—Jin F. Ng
*Assistant Examiner*—Christine K. Oda
*Attorney, Agent, or Firm*—Ridout & Maybee

[57] ABSTRACT

A hazard warning device for use in place of a conventional flare has a lamp assembly using a long shelf life battery to over-run light emitting diodes under control of a low duty cycle low frequency oscillator. The lamp assembly is built into a lens at one end of a baton-like device, the remainder of which is a stem provided with a strut assembly similar to an umbrella frame which can be deployed between a folded condition with the struts lying against the stem and a deployed condition in which it forms a tripod support for the device.

7 Claims, 3 Drawing Sheets

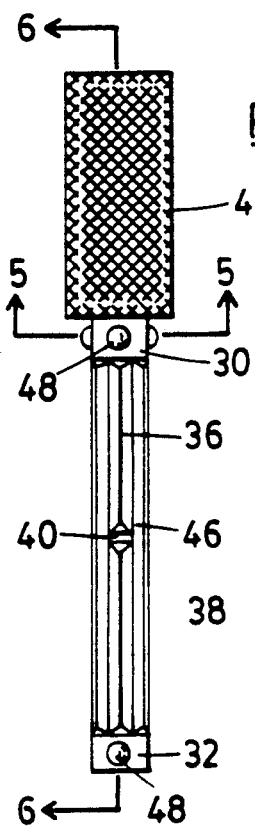
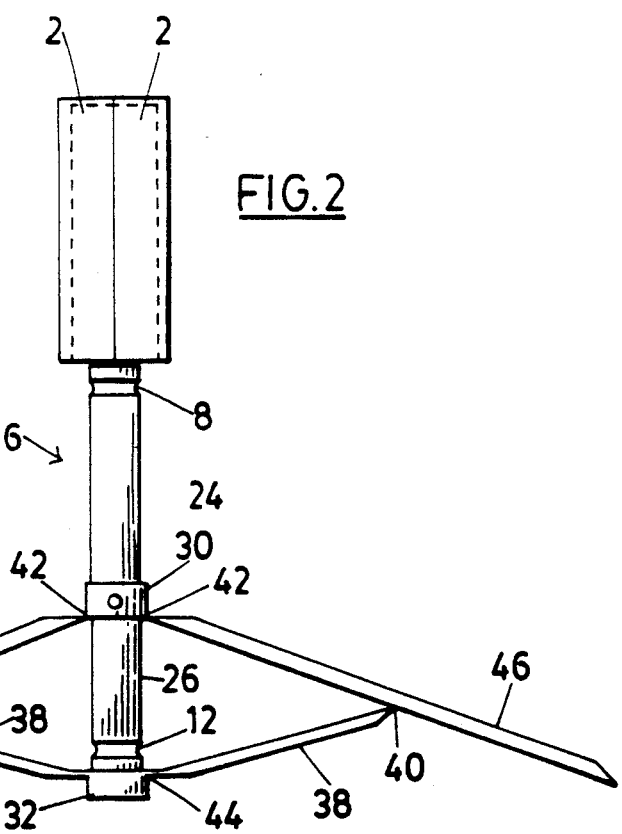
FIG.1
FIG.2

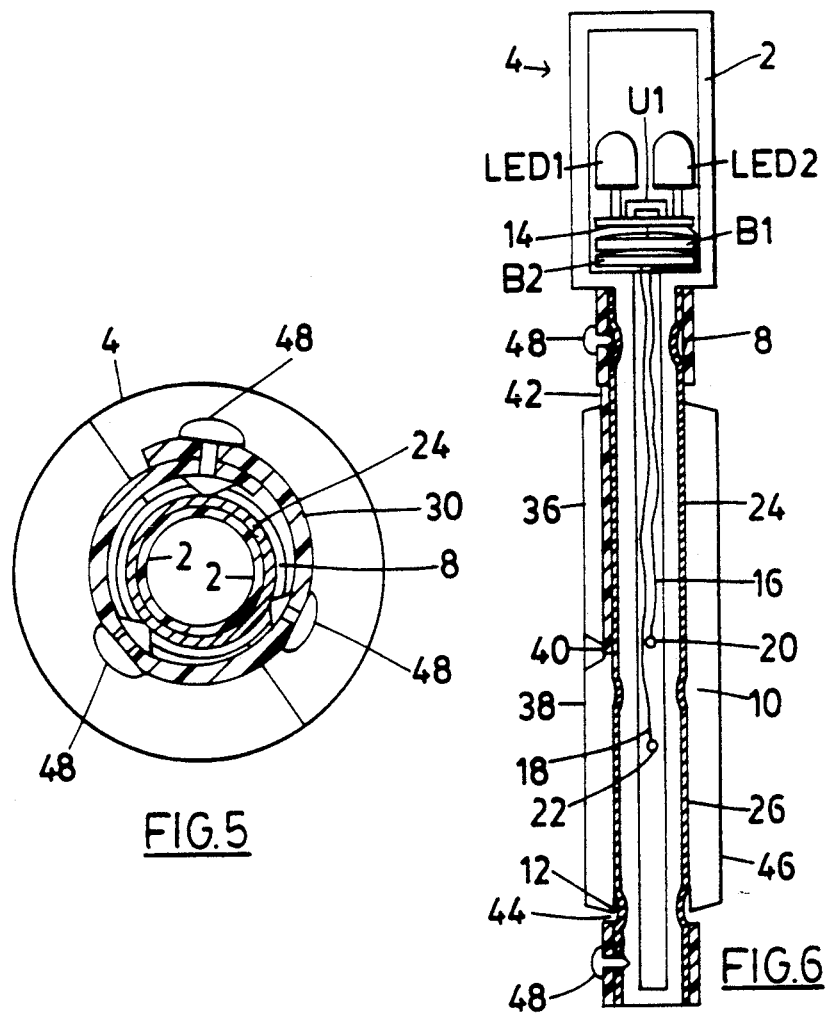
FIG.5
FIG.6
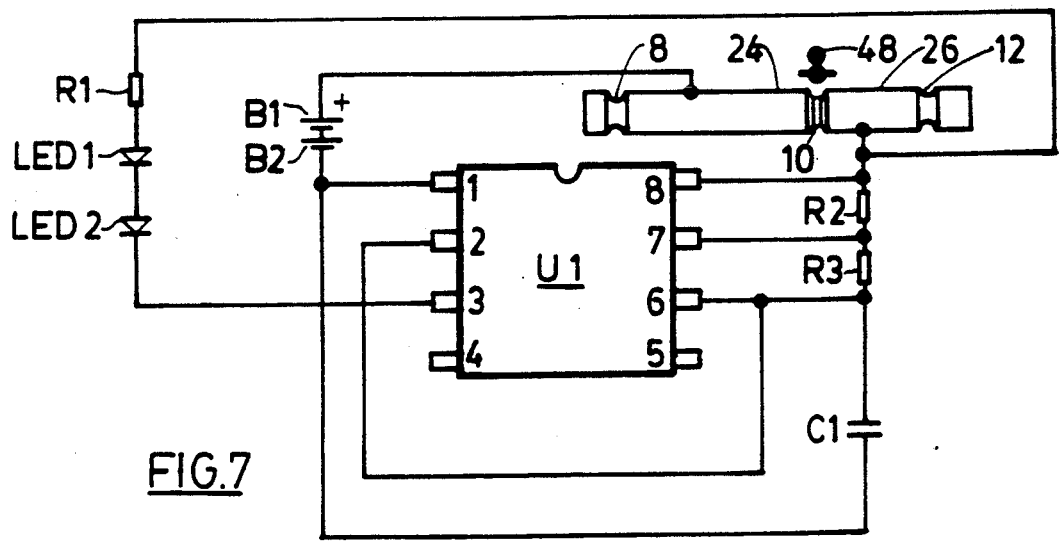
FIG.7

HAZARD WARNING LIGHT

BACKGROUND OF THE INVENTION

1. Field Of The Invention

This invention relates to hazard warning devices such as are used to protect disabled vehicles on highways, and in other analogous applications.

2. Review Of The Prior Art

The device commonly used for the above purpose is a slow burning red pyrotechnic flare. Such flares have various disadvantages, of which some of the most evident are limited shelf life, susceptibility to damp, the use of highly combustible material, as well as the possibility of accidental burns to the user or the starting of fires if carelessly used. In addition, there is often no means available for supporting such flares in an upright position during use; their visibility may be considerably reduced if they lie flat on the ground. Such a flare can of course be used only once, and is difficult to extinguish once lit.

Another widely used form of hazard warning device is a reflective red triangle, which may be made collapsible and provided with an integral prop. Whilst easy to use, and having an indefinite life, it depends for its effectiveness upon the reflection of light transmitted by an approaching vehicle and is thus limited in its usefulness.

U.S. Pat. No. 2,237,536 to Wells discloses a portable light signal which motorists can set up in emergencies. The signal comprises a signal lamp, a cylindrical lamp shaft which holds the lamp and extendable support legs. Legs 23 are hinged at a medial portion of the lamp shaft. As shown in FIG. 3, when the legs are extended to support the signal, an end 31 of one of the legs engages a leaf spring contact 32 to complete the light circuit and to automatically actuate the light. See page 2, first column. lines 7-36.

U.S. Pat. No. 3,415,476 to McDermott discloses a collapsible stand for lighting devices. The support legs are hingably attached to the end of the lamp which comes into contact or near contact with the surface on which the lighting device is placed. When the device is not being used, the legs are pulled upward as shown in FIG. 7.

U.S. Pat. No. 4,447,802 to Bose and U.S. Pat. No. 2,972,739 to Opper disclose alternative structures used to support portable safety and warning lights.

SUMMARY OF THE INVENTION

The present invention seeks to provide a substitute for the conventional flare which can overcome its disadvantages as outlined above, while incorporating some of the advantages of the reflective triangle device, and which can be manufactured cheaply.

In a first aspect, there is provided a hazard warning device comprising a long shelf life battery, an oscillator generating a low frequency, low duty cycle switching waveform, a driving circuit controlled by said oscillator, at least one high brightness light emitting diode and a current limiting resistor in series with the driving circuit, and means to complete a circuit from said battery to said oscillator, said driving circuit, said current limiting resistor, the potential of the battery and the number and type of diodes being such that the current through the at least one diode greatly exceeds the manufacturers maximum continuous current rating for each diode, whilst maintaining an expected mean time before failure of the diode when operated in the device at a level which substantially exceeds the expected life of the battery when the device is continuously operated.

The invention also extends to a hazard warning device comprising an elongated tubular vertical body, a light source at an upper end of the body, two spaced collars on the body, at least one of the collars being movable longitudinally of the body between first and second detented longitudinally spaced positions thereon, and an assembly of spokes connected between the collars for deployment between a condition in which the spokes are folded parallel and adjacent the body and a deployed condition in which the spokes form a multipod support for the device as said one collar is moved from said first to said second position, the collar also acting to switch on the device.

Further features of the invention will become apparent from the following description of a preferred embodiment with reference to the accompanying drawings.

SHORT DESCRIPTION OF THE DRAWINGS

In the drawings:

FIG. 1 is a side elevation of a hazard warning device in its dormmant condition prior to deployment;

FIG. 2 is a side elevation of the device in active condition after deployment;

FIG. 5 is a section on the line 5—5 in FIG. 1;

FIG. 6 is longitudinal section on the line 6—6 in FIG. 5; and

FIG. 7 is a schematic diagram of the device.

DESCRIPTION OF THE PREFERRED EMBODIMENT

Figure 3:
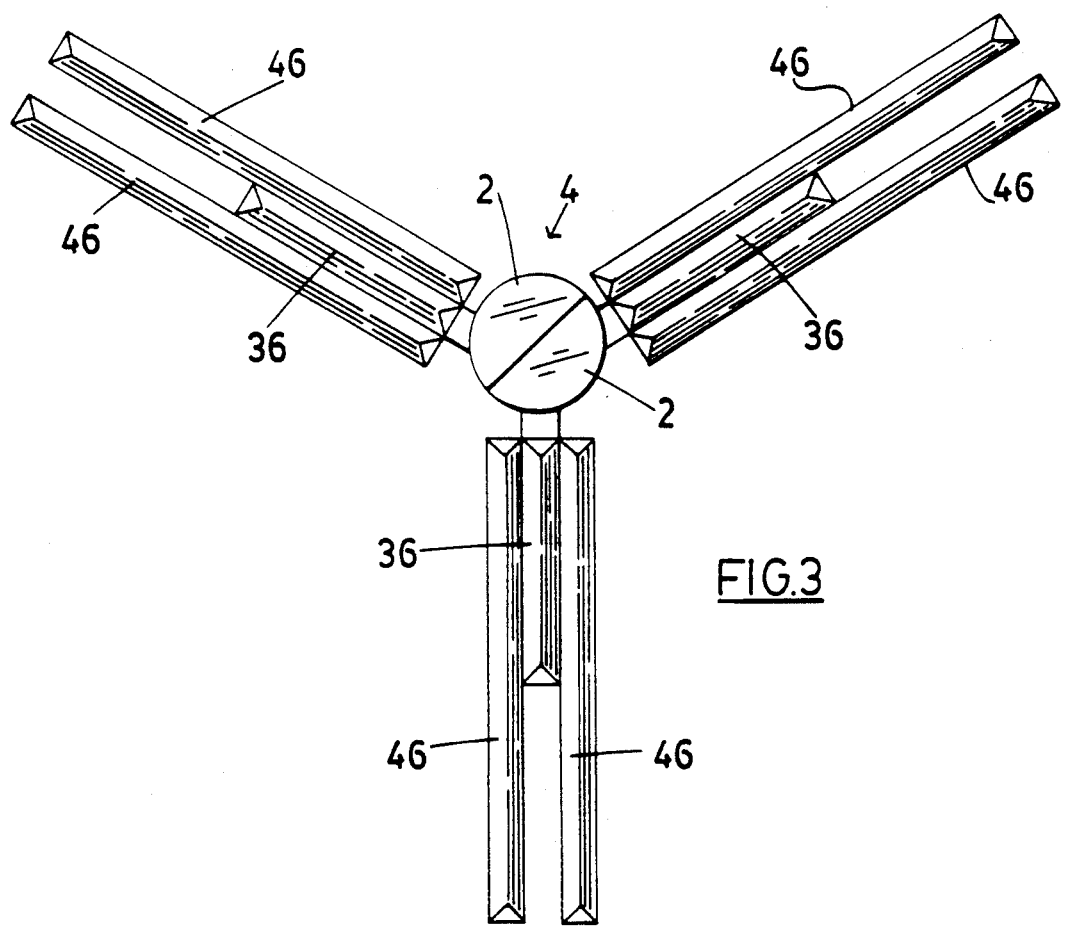
FIG. 3 is a plan view of the device after deployment.

The hazard warning device of the invention is based upon an elongated cylindrical housing moulded in two identical semicylindrical parts 2 from a clear synthetic plastic material such as polycarbonate resin, which may optionally be colored red. The housing has an upper lens portion 4 of increased internal and external diameter as compared to an elongated stem portion 6. The stem portion is formed with three longitudinally spaced external peripheral grooves 8, 10 and 12. The lens portion may be internally configured in known manner so as to enlarge the apparent size of an interior light source. Assembled within the lower portion of the lens portion is a lamp assembly comprising in this example two light emitting diodes LED1 and LED2, a printed circuit board 14 and battery formed of button cells B1 and B2. Wires 16 and 18 from the assembly pass down the interior of the stem portion and pass through holes 20 and 22 in one part 2 to its exterior. The two parts 2 are secured together by thin metal sleeves 24 and 26, typically of plated mild steel about 0.2 mm thick, the sleeve 24 being crimped near its upper end into the groove 8 to form a first detent, and at its lower end being crimped into groove 10 so as not to contact the upper end of sleeve 26 which is also crimped into the same groove, forming a second detent. The lower end of sleeve 26 is crimped into the groove 12. The sleeves are connected respectively to the wires 16 and 18.

Figure 4:
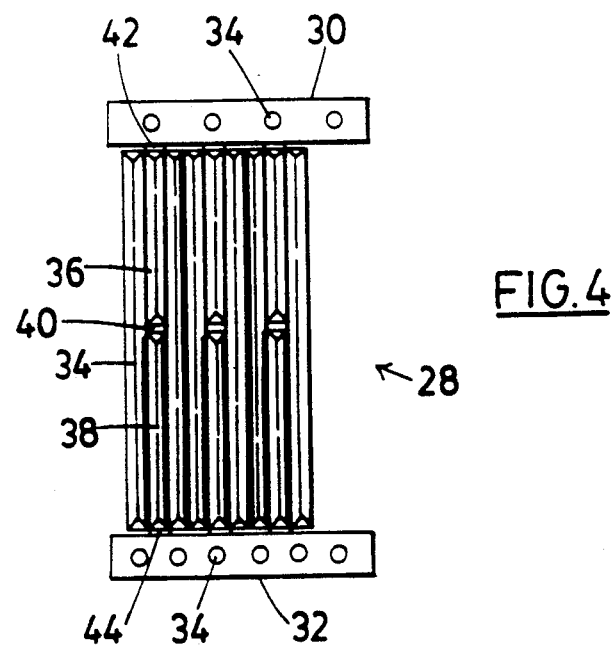
FIG. 4 is view of a spoke assembly used in the device, prior to incorporation in the latter.

Secured around the sleeves on the stem portion is a spoke assembly 28, best shown in FIG. 4, which is moulded from a hinge forming synthetic plastic such as polypropylene. This assembly consists of upper and lower flexible straps 30, 32 formed with perforations 34, and joined by three spokes each comprising a triangular section struts formed by substantially rigid upper and lower portions 36 and 38 joined to each other and to the straps by thin flexible hinge portions 40, 42 and 44. The upper strut portions 36 of each spoke are joined to, and the lower portions 38 are flanked by, further substantially rigid struts 46 which are not connected to the straps 30 and 32. In order to provide the desired degree of flexibility, the straps are much thinner than the struts, and the hinge portions are still thinner.

The upper and lower straps are secured into collars, surrounding the stem of the device outside the sleeves 24 and 26, by metallic rivets 48 passing through perforations 48 at opposite ends of the straps, and further rivets 48 may be located in the remaining perforations 34. The inner ends of the rivets in the upper strap are rounded and are releasably detained by the first detent. The rivets securing the lower strap 32 also indent the parts 2 so as to hold the resulting collar against movement.

The printed circuit board 14 carries (see FIGS. 6 and 7) an integrated circuit U1, resistors R1, R2 and R3, capacitor C1, and diodes LED1 and LED2 (see FIG. 7). The integrated circuit U1 is an industry standard 555 timer which, in the configuration used, provides an oscillator circuit whose characteristics are determined by external components, and an output circuit for driving an external load. The internal output circuit may be supplemented by an external switching transistor to enhance the switching characteristics and driving capability of the internal circuit. The resistors R2 and R3 together with the capacitor C1 are the external components, selected to provide an oscillator output to the transistor having a one second repetition rate and a 20% duty cycle, whilst the resistor R1 is selected to limit the current through the diodes LED 1 and LED 2. Since the diodes are required to last only as long as the cells B1 and B2, they may advantageously be substantially over-run so as greatly to increase their light output. The low duty cycle means that the current through the diodes can substantially exceed their rated continuous current. The resistor R1 is selected so that, when operated in the circuit shown, the diodes will still have a mean time before failure substantially in excess of the expected duration for which the batteries can drive the circuit before becoming exhausted, even though they are being operated at instantaneous currents greatly in excess of the maximum specified by the manufacturer of the diode for continuous operation. Thus a diode with a continuous rating of 20 ma can be operated at a current of 100 ma (providing approximately 5 times as much light), or even 300 ma (providing approximately 15 times as much light). Even in the latter case, two small lithium button cells can operate the circuit for many hours, well in excess of any conventional flare.

In order to use the device, the collar 30 is pulled downwardly towards the strap 32 so that the inner ends of the rivet or rivets 48 disengage from the first detent in groove 8 and move down over the sleeve 24 until they drop into the second detent formed in groove 10. During this movement the hinges 42 between the strut portions 36 and 38 move outwardly, causing the strut portions 36 to move the further struts 46 and deploy the spoke assembly in umbrella fashion as shown in FIGS. 2 and 3, thus providing a tripod support for the device. Although the three spokes provided by the struts 36, 38 and 46 constitute a preferred arrangement because of its simplicity and stability, other multipod arrangements could be used.

As the rivet or rivets 48 engage the groove 10, they establish an electrical connection between the sleeves 24 and 26, and thus between the wires 16 and 18. This completes circuits between the battery formed by cells B1, B2 and the printed circuit board and activates the timer chip, the driver transistor of which supplies low duty cycle pulses of current to the diodes LED1 and LED2 through the current limiting resistor R1. Since the diodes are overdriven, they produce flashes of light at high intensity, providing with the aid of the lens portion 4 a highly visible warning sign. Using two small, readily available 3 volt lithium button cells to provide the batteries B1 and B2, and low cost high intensity light emitting diodes for diodes LED 1 and LED2, over-driven as discussed above, many hours of continuous operation can be obtained. Typically the diodes can be driven at many times their continuous current rating without exceeding their maximum current rating, and without unduly reducing their mean time before failure. The use of lithium cells is particularly preferred because of their very long claimed shelf time, often up to 10 years, but other batteries such as alkaline manganese batteries having long shelf life may be acceptable. By long shelf life is meant that the battery when unused will retain a major proportion of its original capacity over an extended period of at least one year and preferably at least three years.

When the hazard warning is no longer required, it may be turned off and the device restored to its folded condition by pulling the collar 30 back to its original position. Provided that sufficient battery life remains, it may then be stored for further use.

It should be appreciated that a flashing hazard warning light arrangement electrically similar to that described may be incorporated into hazard warning devices of other physical structures; for example, in order to illuminate internally the lenses of a reflective triangle as mentioned above. Likewise, the physical structure of the device could be utilized in conjunction with an alternative form of flashing or steady light source to form a free standing lamp or beacon.

I claim:

1. A hazard warning device comprising a long shelf life battery, an oscillator generating a low frequency, low duty cycle switching waveform, a driving circuit, controlled by said oscillator, at least one high brightness light emitting diode and a current limiting resistor in series with the driving circuit, and means to complete a circuit from said battery to said oscillator, said driving circuit, said current limiting resistor, the potential of the battery and the number and type of diodes being selected such that the current through the at least one diode greatly exceeds the manufacturers maximum continuous current rating for each diode, whilst maintaining an expected mean time before failure of the diode when operated in the device at a level which substantially exceeds the expected life of the battery when the device is continuously operated.

2. A hazard warning device according to claim 1, wherein the battery comprises at least one lithium button cell.

3. A hazard warning device comprising an elongated tubular vertical body, a light source at an upper end of the body, a battery within the body, two spaced collars on the body, one collar being movable longitudinally of the body between first and second detented longitudinally spaced positions thereon, an assembly of spokes connected between the collars for deployment between a condition in which the spokes are folded parallel and adjacent the body and a deployed condition in which the spokes form a multipod support for the device as said one collar is moved from said first to said second position, and an electrical circuit incorporating said light source, said battery, and means responsive to said one collar entering said second position to complete said circuit between the light source and the battery.

4. The device according to claim 3, wherein the light source comprises the battery and a light producing means in a circuit with the battery, and further including means responsive to said one collar entering said second position to complete said circuit with the battery.

5. The device according to claim 4, wherein the collar responsive means comprises longitudinally spaced metallic sleeves on said body, and at least one metallic stud on said one collar which completes a circuit between the sleeves when said collar is in said second position.

6. The device according to claim 3, wherein said spoke assembly comprises groups of struts moulded in one piece from a hinge-forming synthetic plastic, the struts in each group being arranged parallel with one another with a strut in each group being formed in two end to end portions and extending between two perpendicular end pieces, the strut portions and end pieces being mutually connected by hinge-forming portions of reduced thickness.

7. The device according to claim 3, wherein the light source comprises a long shelf life battery, an oscillator generating a low frequency, low duty cycle switching waveform, a driving circuit controlled by said oscillator, at least one high brightness light emitting diode and a current limiting resistor in series with the driving circuit, and means to complete a circuit from said battery to said oscillator, said driving circuit, said current limiting resistor, the potential of the battery and the number and type of diodes being selected such that the current through the at least one diode greatly exceeds the manufacturers maximum continuous current rating for each diode, whilst maintaining an expected mean time before failure of the diode when operated in the device to a point at a level which substantially exceeds the expected life of the battery when the device is continuously operated.

* * * * *